United States Patent
Pitzen

[19]

[11] Patent Number: 6,126,707
[45] Date of Patent: Oct. 3, 2000

[54] DISPOSABLE AIR FILTER WITH IMPROVED FRAME

[75] Inventor: James F. Pitzen, Maplewood, Minn.

[73] Assignee: 3M Innovative Properties Company, St. Paul, Minn.

[21] Appl. No.: 09/263,974

[22] Filed: Mar. 5, 1999

[51] Int. Cl.[7] .................................................. B01D 46/00
[52] U.S. Cl. ............................... 55/495; 55/497; 55/499; 55/501; 55/DIG. 31; 428/83; 428/122
[58] Field of Search ................................ 428/122, 81, 83; 55/495, 499, 497, 501, 511, DIG. 31

[56] References Cited

U.S. PATENT DOCUMENTS

| | | |
|---|---|---|
| 3,392,846 | 7/1968 | Getzin . |
| 3,659,719 | 5/1972 | Westlin et al. . |
| 4,124,362 | 11/1978 | Westin, et al. . |
| 4,177,050 | 12/1979 | Culbert et al. . |
| 4,373,635 | 2/1983 | Mules . |
| 4,518,402 | 5/1985 | Dargel . |
| 5,114,448 | 5/1992 | Bartilson . |
| 5,368,622 | 11/1994 | McMillon . |
| 5,399,180 | 3/1995 | Kopp . |
| 5,476,526 | 12/1995 | Attermeyer . |
| 5,531,892 | 7/1996 | Duffy . |
| 5,573,562 | 11/1996 | Schauwecker et al. . |
| 5,674,303 | 10/1997 | TerHorst . |
| 5,704,953 | 1/1998 | Stemmer . |
| 5,782,944 | 7/1998 | Justice . |

FOREIGN PATENT DOCUMENTS

42 39 478A1   5/1994   Germany .

*Primary Examiner*—Alexander Thomas
*Attorney, Agent, or Firm*—William L. Huebsch

[57] ABSTRACT

A disposable air filter comprising a sheet of filter media, at least portions of the major surfaces of which are disposed to define parallel planes along those opposite major surfaces of the sheet intended to be placed normal to the direction of movement of air through the filter; and a frame. The frame includes (1) a peripheral frame component around a rectangular peripheral edge of the sheet of filter media, which peripheral frame portion comprises elongate edge wall portions extending along and across the peripheral edge of the sheet of filter media, which edge wall portions are disposed at generally a right angle with respect to the parallel planes defined by the sheet of filter material; and elongate retaining wall portions extending from opposite elongate edges of the edge wall portions for short distances along the major surfaces of the sheet of filter media with parts of the attachment wall portions opposite each other and spaced from the edge wall portions being attached to the sheet of filter media; and (2) a reinforcing frame component comprising elongate outer wall portions overlaying and attached along outer surfaces of the edge wall portions with the outer wall portions disposed at generally a right angle with respect to the parallel planes defined by the filter media, and a side wall portion extending from the outer wall portions along and parallel to the plane defined by the first major surface of the sheet. That side wall portion includes a continuous retaining wall part extending a short distance from corresponding edges of the side wall portions at about right angles with respect to the side wall portions, and can also include intersecting grid-like parts extending between oppositely disposed locations along the retaining wall part and defining large openings through the side wall portion that afford free passage of air through the side wall portion.

6 Claims, 6 Drawing Sheets

DISPOSABLE AIR FILTER WITH IMPROVED FRAME

FIELD OF THE INVENTION

The present invention relates to the structures of the frames included in disposable air filters of the type used in home heating systems to filter particles from air traveling through air plenums.

BACKGROUND OF THE INVENTION

Disposable air filters of the types used in home heating systems to filter particles from air traveling through air plenums typically comprise (1) a sheet of filter media shaped (e.g., pleated, corrugated, or planar) so that portions of opposite major surfaces of the sheet of filter media are disposed to define parallel planes along those opposite surfaces intended to be placed normal to the direction of movement of air through the filter; and (2) a rectangular frame of folded and adhered together chip board portions around a peripheral edge of the sheet of filter media. Typically, the frame of the air filter is slid edgewise into a U-shaped metal filter mounting channel that extends around three or four sides of the plenum. The channel then closely engages the frame of the air filter on at least three sides to position the sheet of filter media in the air filter transversely across the air plenum. Particulate in air traveling through the plenum is collected in the filter media. As the filter media fills with particulate, it provides increased resistance to the passage of air resulting in increased air pressure against one face or side of the filter. Engagement between the channel and the frame of the filter should prevent deformation of the filter as a result of this pressure, for if it does not, unfiltered air can pass around the edges of the deformed filter.

Figure 1:
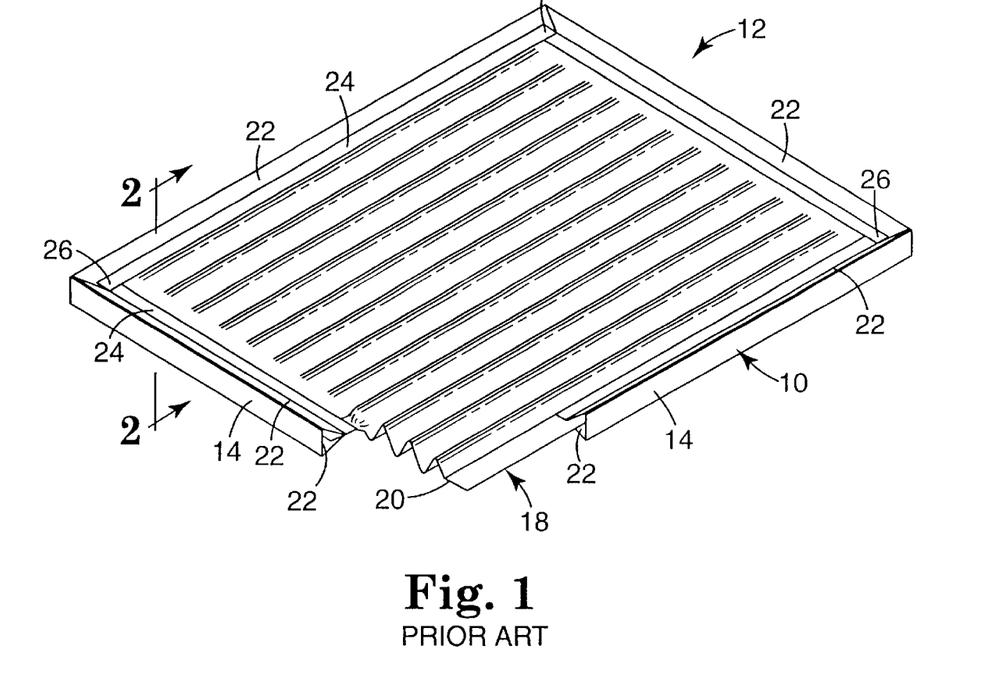
FIG. 1 is a perspective view of a first embodiment of a prior art disposable air filter having a part of its frame broken away to show detail.
Figure 2:
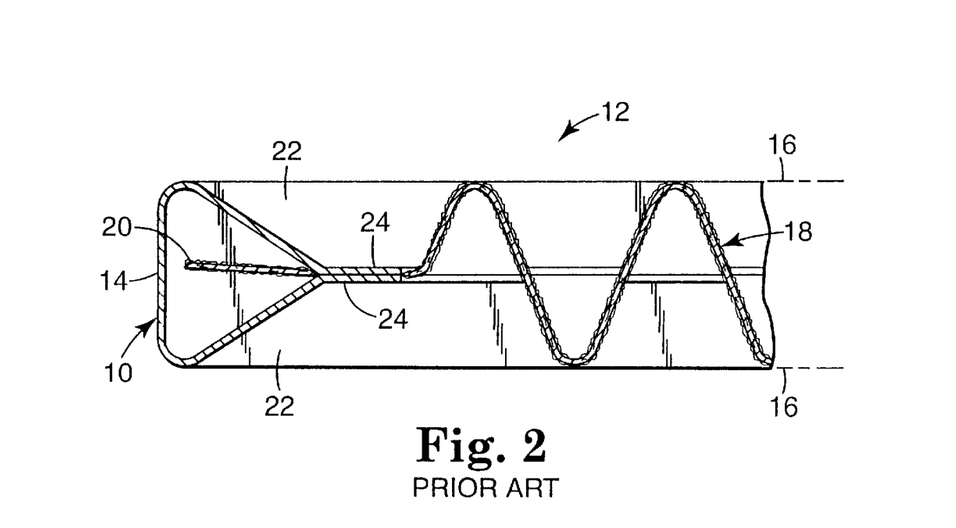
FIG. 2 is an enlarged sectional view taken approximately along line 2—2 of FIG. 1.
Figure 3:
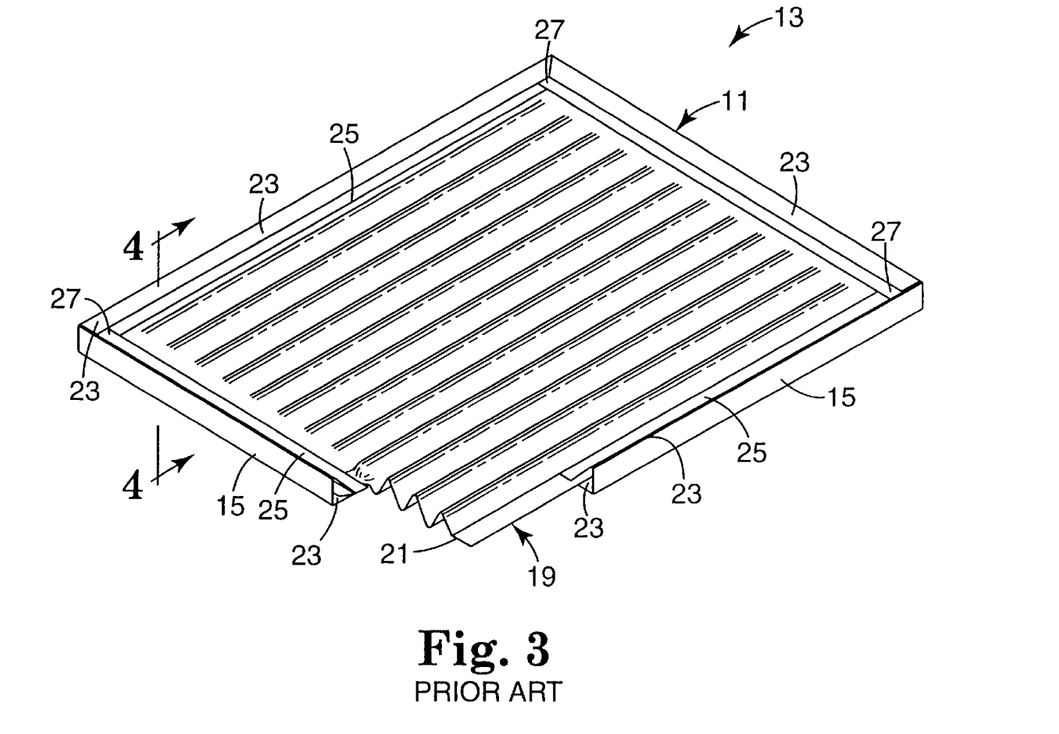
FIG. 3 is a perspective view of a second embodiment of a prior art disposable air filter having a part of its frame broken away to show detail.
Figure 4:
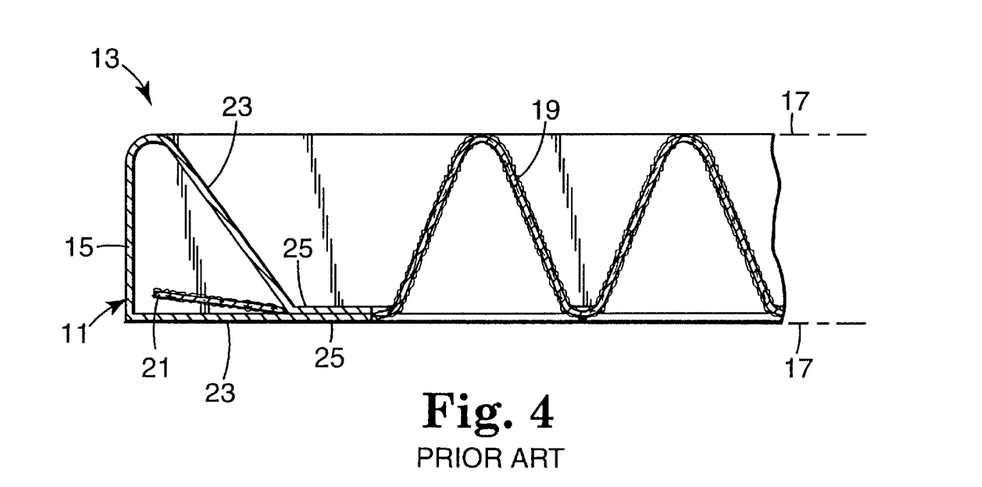
FIG. 4 is an enlarged sectional view taken approximately along line 4—4 of FIG. 3.

FIGS. 1 and 2 of the drawing illustrate one commercially available prior art disposable air filter 12 including a chip board frame 10 around a pleated sheet 18 of filter media, whereas FIGS. 3 and 4 of the drawing illustrate another commercially available prior art disposable air filter 13 including a chip board frame 11 around a pleated sheet 19 of filter media. The chip board frames 10 and 11 in both of those filters 12 and 13 include elongate edge wall portions 14 and 15 respectively disposed in rectangles and generally at right angles with respect to parallel planes 16 and 17 respectively defined by parts of the pleated sheets 18 and 19 of filter media, which edge wall portions 14 and 15 extend along, across, and entirely around rectangular peripheral edges 20 and 21 respectively of the sheets of filter media 18 and 19. Those chip board frames 10 and 11 also include elongate retaining wall portions 22 and 23 respectively that extend from the opposite edges of the edge wall portions 14 and 15 for short distances (e.g., 1 inch or 2.54 centimeters) along the opposite major surfaces of the pleated sheets of filter media 18 and 19. Parts 24 and 25 respectively of those retaining wall portions 22 and 23 opposite each other and spaced from the edge wall portions 14 and 15 are attached by means such as a suitable adhesive to the sheets of filter media 18 and 19 (the end of the pleats in the filter media 18 and 19 being flattened between those parts 24 and 25 of the retaining wall portions 22 and 23), and end parts 26 and 27 respectively of the retaining wall portions 22 and 23 at the corners of the filter 12 or 13 overlap and are attached by means such as a suitable adhesive. In the prior art disposable air filter 12 illustrated in FIGS. 1 and 2 that is of the type sold by American Air Filters, Louisville, Ky., under the trademark "Dirt Demon" those retaining wall portions 22 both extend from the edges of the edge wall portions 14 at included angles significantly less than a right angle with respect to the edge wall portions 14 (i.e., angles of about 60 degrees) so that the cross section of the frame 10 (see FIG. 2) is generally in the shape of an equilateral or isosceles triangle. In the prior art disposable air filter 13 illustrated in FIGS. 3 and 4 that is of the type sold by Minnesota Mining and Manufacturing Company, St. Paul, Minn., under the trade name "Filtrete"(t.m.) High Performance Clean Air Filter, those retaining wall portions 23 on one side of the filter 13 extend from corresponding edges of the edge wall portions 15 at about right angles with respect to the edge wall portions 15, and the retaining wall portions 23 extending from the edges of the edge wall portions 15 on the other side of the filter 13 extend at angles significantly less than a right angle with respect to the edge wall portions 15 (i.e., an angle of about 45 degrees) so that the cross section of the frame 11 (see FIG. 4) is generally in the shape of a right-angled triangle. The frames 10 and 11 in these air filters 12 and 13 are of a type called "pinch frames" in the air filter industry, and only extend around peripheral portions of the sheets 18 and 19 of filter media, leaving totally exposed and unsupported both sides of all but those peripheral portions of the sheets 18 and 19 of filter media that are received in the frames 10 and 11.

Figure 5:
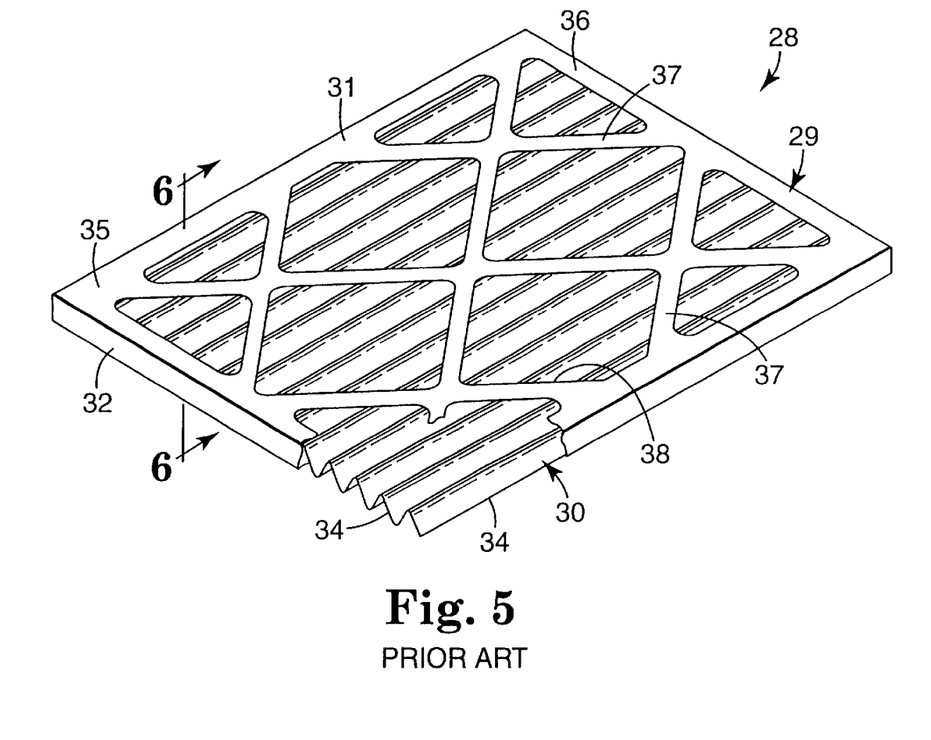
FIG. 5 is a perspective view of a third embodiment of a prior art disposable air filter having a part of its frame broken away to show detail.
Figure 6:
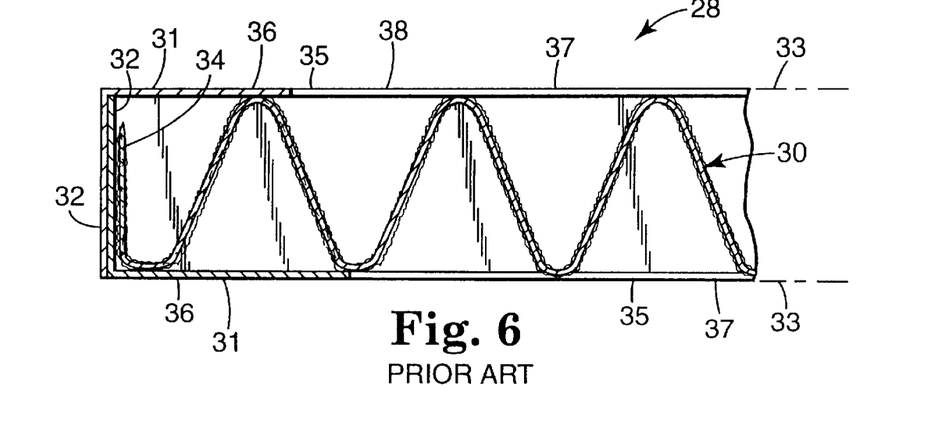
FIG. 6 is an enlarged sectional view taken approximately along line 6—6 of FIG. 5.

FIGS. 5 and 6 of the drawing illustrate another prior art disposable air filter 28 having a frame 29 of folded and adhered together chip board portions that is sold by Minnesota Mining and Manufacturing Company, St. Paul, Minn., under the trade name "Filtrete"(t.m.) Micro particle air filter. The frame 29 of that air filter 28 is of a type called a "box frame" in the air filter industry, and more fully encloses a pleated sheet 30 of filter media than do the "pinch" frames 10 and 11 of the air filters 12 and 13 illustrated in FIGS. 1 through 4. That frame 29 includes two essentially identical parts 31, each of which parts 31 includes elongate edge wall portions 32 disposed in a rectangle and generally at right angles with respect to two parallel planes 33 defined by parts of the pleated sheet 30 of filter media, which edge wall portions 32 extend along, across, and entirely around a rectangular peripheral edge 34 of the sheet 30 of filter media. Each part 31 of the frame 29 also includes a side wall portion 35 extending from corresponding edges of the edge wall portions 32 entirely across the sheet 30 of filter media along and parallel to one of the two parallel planes 33 defined by parts of the major surfaces of that sheet 30. That side wall portion 35 includes a continuous retaining wall part 36 extending a short distance (e.g., 1 inch or 2.54 centimeters) from corresponding edges of the edge wall portions 32 at about right angles with respect to the edge wall portions 32, and intersecting gridlike parts 37 extending between oppositely disposed locations along the retaining wall part 36 and defining large triangular or diamond shaped openings 38 through the side wall portion 35 that afford free passage of air through the side wall portion 35. The two parts 31 are disposed with their side wall portions 35 on opposite sides of the sheet 30 of filter media and major surfaces of their edge wall portions 32 adjacent and adhered together so that the adhered together edge wall portions 32 and the retaining wall parts 36 extending from them provide a generally U-shaped receptacle for a portion of the sheet 30 of filter media adjacent its periphery, in which U-shaped receptacle that portion of the sheet 30 of filter media is adhered.

While the frames 10, 11 and 29 of the disposable air filters 12, 13, and 28 described above and illustrated in FIGS. 1 through 6 of the drawing can prevent deformation of the filter under normal operating conditions, it has been determined that under extreme test conditions reported below they can be caused to deform, thereby allowing unfiltered air to pass around the edges of the deformed filter 12, 13, or 28.

DISCLOSURE OF THE INVENTION

The present invention (1) provides a disposable air filter with a frame that, when the same size and of the same weight chip board as the frames of the disposable filters described above, provides superior strength against deformation under the extreme test conditions reported below when compared to the frames of the disposable air filters described above; (2) affords the versatility in one production line of making disposable air filters with frames of different structural strengths; (3) and allows disposable air filters having frames with about the same structural strengths as those described above to be manufactured from lighter weight and thereby lesser cost chip board.

According to the present invention there is provided an air filter comprising a sheet of filter media, at least portions of the major surfaces of which are disposed (e.g., pleated or flat) to define parallel planes along those major surfaces intended to be placed normal to the direction of movement of air through the filter; and a frame. That frame includes:

(1) a peripheral frame component around a rectangular peripheral edge of the sheet, which peripheral frame component comprises elongate edge wall portions extending along and across the peripheral edge of the sheet of filter media, which edge wall portions are disposed at generally a right angle with respect to the parallel planes defined by the sheet of filter material, and elongate retaining wall portions extending from opposite elongate edges of the edge wall portions for short distances along the major surfaces of the sheet of filter media with portions of the attachment wall portions opposite each other and spaced from the edge wall portions attached to the sheet of filter media; and (2) a reinforcing frame component comprising elongate outer wall portions overlaying and attached along outer surfaces of the edge wall portions of the peripheral frame component with the outer wall portions disposed at generally a right angle with respect to the parallel planes defined by the sheet of filter media, and a side wall portion extending from the outer wall portions along and parallel to the plane defined by the first major surface of the sheet of filter media. The side wall portion has a continuous retaining wall part extending a short distance (e.g., 1 inch or 2.54 centimeters) from corresponding edges of the side wall portions at about right angles with respect to the outer wall portions, and can further include intersecting grid-like parts extending between oppositely disposed locations along the retaining wall part and defining large openings through the side wall portion that affording free passage of air through the side wall portion.

This novel structure is provided when the reinforcing frame component (which can have the same structure as one of the parts 31 of the frame 29 for the disposable air filter 28 described above with reference to FIGS. 5 and 6 of the drawing) is added to a disposable air filter 12 or 13 of one of the types described above with reference to FIGS. 1, 2, 3, and 4 of the drawing that has only a peripheral "pinch" frame (e.g., the prior art disposable air filter sold by Minnesota Mining and Manufacturing Company under the trade name "Filtrete"(t.m.) Clean Air Filter or the prior art disposable air filter sold by American Air Filters under the trademark "Dirt Demon"). Such addition of the reinforcing frame component to such a peripheral frame component provides a frame for the disposable filter with greater strength when tested in the manner described below than does even the more fully enclosing frame 29 described above with reference to FIGS. 5 and 6 of the drawing that is used on the prior art disposable air filter sold by Minnesota Mining and Manufacturing Company under the trade name "Filtrete"(t.m.) Micro particle air filter Air filter. Thus, this invention allows the same production line to easily produce either known disposable air filters of the types 12 and 13 described above that have only peripheral "pinch" frames 10 or 11, or, by the simple addition of the reinforcing frame component, a disposable air filter according to the present invention with a stronger frame.

When the reinforcing frame component is thus added to the peripheral frame of the disposable air filter described above that is sold by Minnesota Mining and Manufacturing Company under the trade name "Filtrete"(t.m.) Clean Air Filter, retaining wall portions along first edges of the edge wall portions will extend generally at a right angle with respect to the edge wall portions, retaining wall portions along opposite second edges of the edge wall portions will extend at angles significantly less than a right angle with respect to the edge wall portions to which they are attached, and the side wall of the reinforcing frame portion will extend from the edges of the outer wall portions adjacent the second edges of the edge wall portions.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 7:
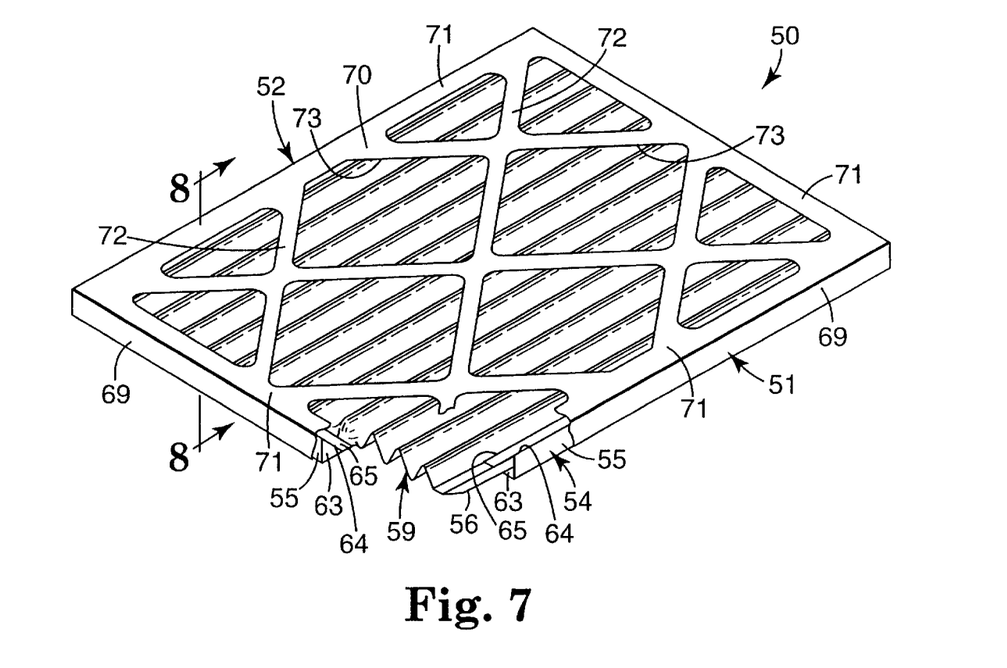
FIG. 7 is a perspective view of a first embodiment of a disposable air filter according to the present invention having a part of its frame broken away to show detail.
Figure 8:
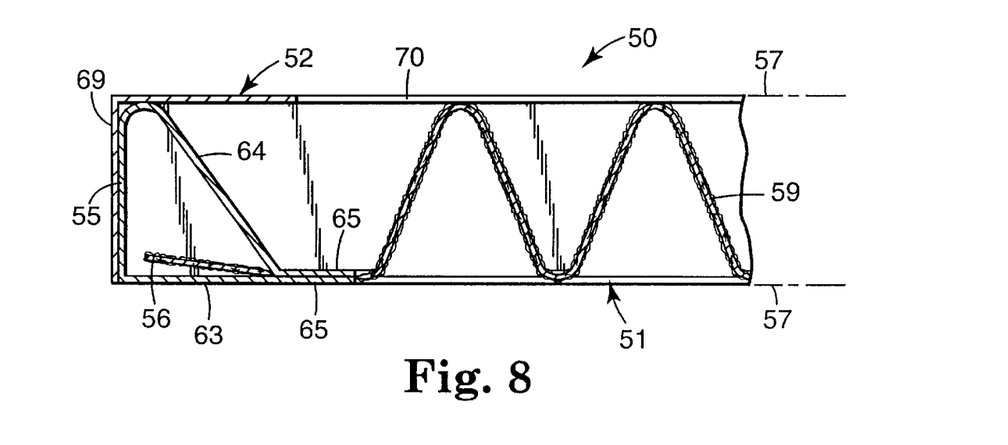
FIG. 8 is an enlarged sectional view taken approximately along line 8—8 of FIG. 7.
Figure 9:
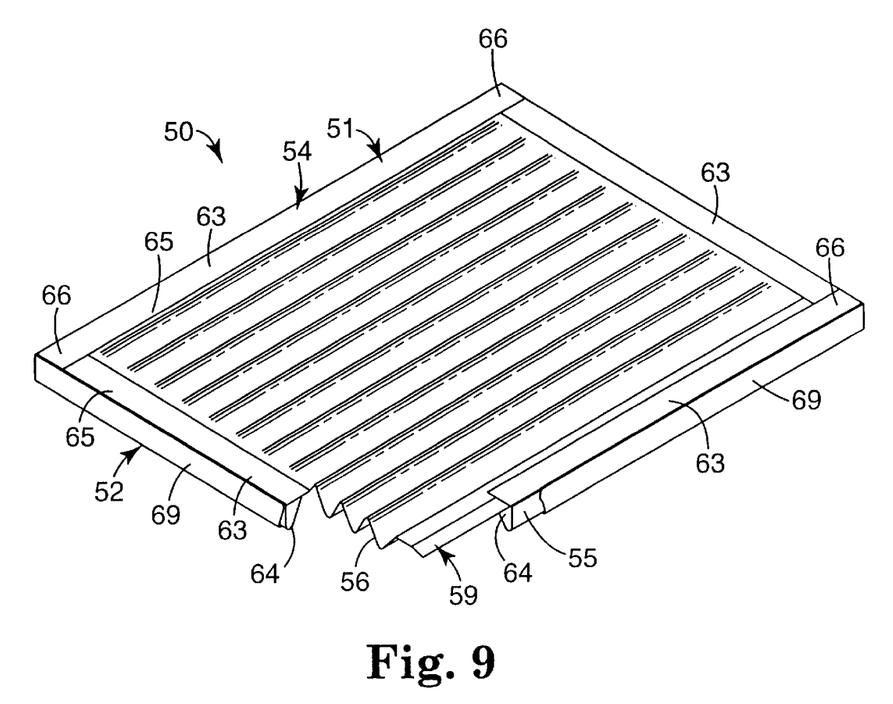
FIG. 9 is a perspective view of the first embodiment of disposable air filter according to the present invention as shown in FIGS. 7 and 8 taken from the side of the filter opposite that shown in FIG. 8.

Referring now to FIGS. 7, 8, and 9, there is illustrated a first embodiment of a disposable air filter according to the present invention generally designated by the reference numeral 50.

As can be seen from a comparison of the disposable air filter 50 with the prior art disposable air filters 13 and 28 illustrated in FIGS. 3, 4, 5, and 6, a frame 51 for the disposable air filter 50 is formed by adding a reinforcing frame component 52 that has essentially the same structure as one part 31 of the frame 29 for the prior art disposable air filter 28 described above with reference to FIGS. 5 and 6 to a peripheral "pinch" frame component 54 that has essentially the same structure as the "pinch" frame 11 of the prior art disposable air filter 13 described above with reference to FIGS. 3 and 4. Like the frame 11 of the disposable air filter 13, the peripheral "pinch" frame component 54 is of folded and adhered together chip board portions (e.g., 26 to 30 point chip board), includes elongate edge wall portions 55 disposed in a rectangle and generally at right angles with respect to parallel planes 57 defined by the outer edges of pleats or corrugations on opposite sides of a pleated or corrugated sheet 59 of filter media, which edge wall portions 55 extend along, across, and entirely around a rectangular peripheral edge 56 of the sheet 59 of filter media. That chip board peripheral frame component 54 also includes elongate retaining wall portions 63 and 64 that extend from the opposite edges of the edge wall portions 55 for short distances (e.g., about 1 inch or 2.5 centimeters) along the opposite major surfaces of the pleated sheet 59 of filter media. Distal parts 65 of those retaining wall portions 63 and 64 opposite each other and spaced from the edge wall portions 55 are attached to the sheet 59 of filter media by means such as a suitable adhesive (the ends of the pleats between the retaining wall portions 63 and 64 being flattened), and end parts 66 of the retaining wall portions 63 and 64 at the corners of the filter 50 overlap and are attached by means such as a suitable adhesive. Those retaining wall portions 63 on one side of the filter 50 extend from corresponding edges of the edge wall portions 55 at about right angles with respect to the edge wall portions 55, and the retaining wall portions 64 extending from the edges of the edge wall portions 55 on the other side of the filter 50 extend at angles significantly less than a right angle with respect to the edge wall portions 55 (i.e., an angle of about 45 degrees) so that the cross section of the peripheral frame component 54 (see FIG. 8) is generally in the shape of a right-angled triangle and the peripheral frame component 54 only extends around peripheral portions of the sheet 59 of filter media.

The reinforcing frame component 52, like one part 31 of the folded chip board frame 29 for the air filter 28 described above with reference to FIGS. 5 and 6, includes elongate outer wall portions 69 disposed generally at right angles with respect to the parallel planes 57 defined by the outer edges of the pleats on opposite sides of the pleated sheet 59 of filter media, which outer wall portions 69 overlay and are attached by means such as a suitable adhesive along outer surfaces of the edge wall portions 55. That reinforcing frame component 52 also includes a side wall portion 70 extending from corresponding edges of the outer wall portions 69 entirely across the sheet 59 of filter media along and parallel to one of the planes 57. That side wall portion 70 includes a continuous retaining wall part 71 extending a short distance (e.g., 1 inch or 2.54 centimeters) from corresponding edges of the outer wall portions 69 at about right angles with respect to the outer wall portions 69, and intersecting elongate grid-like parts 72 extending between oppositely disposed locations along the retaining wall part 71 and defining large triangular or diamond shaped openings 73 through the side wall portion 70 that afford free passage of air through the side wall portion 70.

The filter media in the pleated sheet 59 could be of any known type, such as the filter medial described in U.S. Pat. No. 5,350,620, the content whereof is hereby incorporated herein by reference. The distance between pleats in the sheet 59 and the distance between the planes 57 defined by the opposite outer edges of those pleats can be selected to suit the application of the filter, with 12 pleats per foot spacing the planes 59 about ¾ inch apart being acceptable. Preferably, as is known in the art, an expanded metal grid (e.g., 0.012 gauge expanded galvanized steel or aluminum defining diamond shaped openings about 1.19 inch long and 0.84 inch high) for retaining the shape of the pleats extends along and is bonded to the side of the sheet 59 to be positioned downstream of the air flow when the filter 50 is positioned across an air duct.

Test Results

The Air-Conditioning and Refrigeration Institute (ARI) Standard 680, Section 8, specifies a test procedure for testing the strength of the frames for furnace filters. That test procedure was passed by all of the prior art air filters described above (i.e., the prior art disposable air filter 12 illustrated in and described with reference to FIGS. 1 and 2 that is sold by American Air Filter under the trademark "Dirt Demon"; the prior art disposable air filter 13 illustrated in and described with reference to FIGS. 3 and 4 that is sold by Minnesota Mining and Manufacturing Company, under the trade name "Filtrete"(t.m.) High Performance Clean Air Filter; and the disposable air filter 28 illustrated in and described with reference to FIGS. 5 and 6 that is sold by Minnesota Mining and Manufacturing Company under the trade name "Filtrete"(t.m.) Micro Particle and Airborne Allergen Reduction Filter; and was also passed by an air filter according to the present invention made by adding one part 31 of the frame 29 for the prior art disposable air filter 28 described above with reference to FIGS. 5 and 6 to the frame 11 of the prior art disposable air filter 13 described above with reference to FIGS. 3 and 4 to provide the air filter illustrated in and described with reference to FIGS. 7, 8, and 9. Thus, there was a need to develop a more demanding test.

The filter mounting channel in many furnaces extends around only three its four sides, leaving one of its sides unsupported (i.e., either one of its long sides or one of its short sides, depending on the design of the heating system). Thus, a test was performed in which the prior art air filters and the improved air filter according to the present invention described in the preceding paragraph, each in a large common size of 20 inches by 25 inches by 1 inch (50.8 centimeters by 63.5 centimeters by 2.54 centimeters) was supported on three sides of its frame, covered to prevent air from passing through it, and had air pressure applied to one side until the frame failed along its unsupported side. A first level of partial failure was defined as bowing of the unsupported side of the frame by ⅜ inch or 0.95 centimeter, as such bowing would cause substantial leakage of unfiltered air around the sides of the filter; and a second level of total failure was defined as buckling or bowing of the unsupported side of the frame by over 1¼ inches or 3.2 centimeters at which far worse leakage of unfiltered air would occur. To perform the test, a filter mounting assembly was made that included a ¼ inch thick aluminum plate having a through opening corresponding to the area of exposed filter medial on the air filters to be tested. Aluminum angles were attached to one surface of the plate around the opening in that plate to provide flanges 1¼ inch high projecting at right angles to that surface, which flanges were equally spaced from the opening to define a rectangular socket in which the filters to be tested could be received with the peripheries of the filters fitting closely along the inner surfaces of the flanges. That assembly was then placed in a test air duct with the surfaces of the plate extending transversely across the duct and the surface of the plate on which the angles were mounted facing downstream with respect to the air flow through the duct. A piece of paper or film was placed across the upstream face of a filter to be tested, and that filter and paper were placed in the socket defined by the flanges and the plate with the upstream side of the filter and the paper adjacent the plate. Duct tape was used to tape three sides of the filter to the flanges. A blower in the duct was activated and increased in speed until the unsupported side of the test filter bowed ⅜ inch away from its initial position, whereupon the pressure drop across the filter in inches of water was recorded. The pressure drop across the filter was then monitored as the blower speed was increased until the frame of the test filter buckled or bowed by 1¼ inches, and the pressure drop in inches of water that occurred just prior to that buckling or bowing was recorded. All four sides of each filter were tested in this manner. The test results are shown in the following table. Almost all of the pressures required to cause partial and total failures of the sides of the improved filter according to the present invention described above with respect to FIGS. 7, 8, and 9 exceeded those required to cause partial and total failure of the sides of the three prior art filters described above with reference to FIGS. 1 through 6.

| Tested Filter (20 inch by 25 inch by 1 inch) | Pressure in inches of water to reach 3/8 inch bow | Pressure in inches of water to cause the frame to Buckle | Notes |
| --- | --- | --- | --- |
| Prior Art Filter of FIG. 1 and 2, Short Side 1 | 0.2" | 0.98" | |
| Prior Art Filter of FIG. 1 and 2, Short Side 2 | 0.2" | 0.85" | |
| Prior Art Filter of FIG. 1 and 2, Long Side 1 | 0.2" | 1.0" | |
| Prior Art Filter of FIG. 1 and 2, Long Side 2 | 0.25" | 0.5" | |
| Prior Art Filter of FIG. 3 and 4, Short Side 1 | | 0.85" | |
| Prior Art Filter of FIG. 3 and 4, Short Side 2 | | 0.8" | |
| Prior Art Filter of FIG. 3 and 4, Long Side 1 | 0.4" | 1.95" | |
| Prior Art Filter of FIG. 3 and 4, Long Side 2 | 0.53" | 2.15" | |
| Prior Art Filter of FIG. 5 and 6, Short Side 1 | | 1.9" | |
| Prior Art Filter of FIG. 5 and 6, Short Side 2 | | | No failure @ 2.8" (blower max) |
| Prior Art Filter of FIG. 5 and 6, Long Side 1 | 0.3" | 1.35" | |
| Prior Art Filter of FIG. 5 and 6, Long Side 2 | 0.3" | 1.20" | |
| Improved Filter of FIG. 7, 8 & 9, Short Side 1 | | 2.4" | |
| Improved Filter of FIG. 7, 8 & 9, Short Side 2 | | 2.4" | |
| Improved Filter of FIG. 7, 8 & 9, Long Side 1 | 0.55" | 2.4" | |
| Improved Filter of FIG. 7, 8 & 9, Long Side 2 | 0.65" | | No failure, but kink @ 2.8" (blower max) |

Second Embodiment

Figure 10:
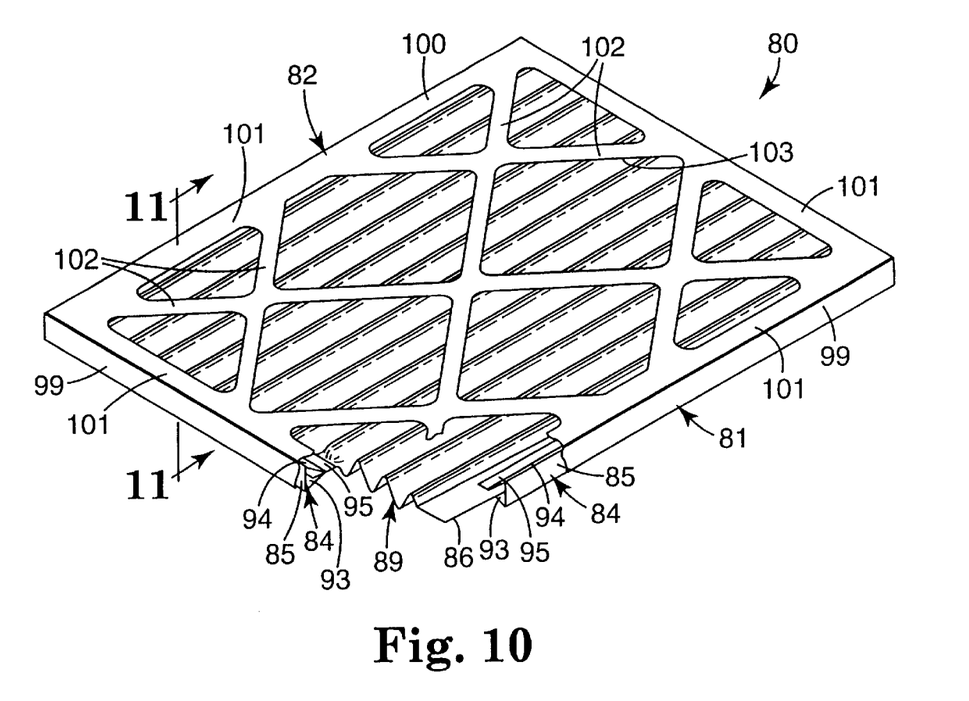
FIG. 10 is a fragmentary perspective view of a second embodiment of a disposable air filter according to the present invention.
Figure 11:
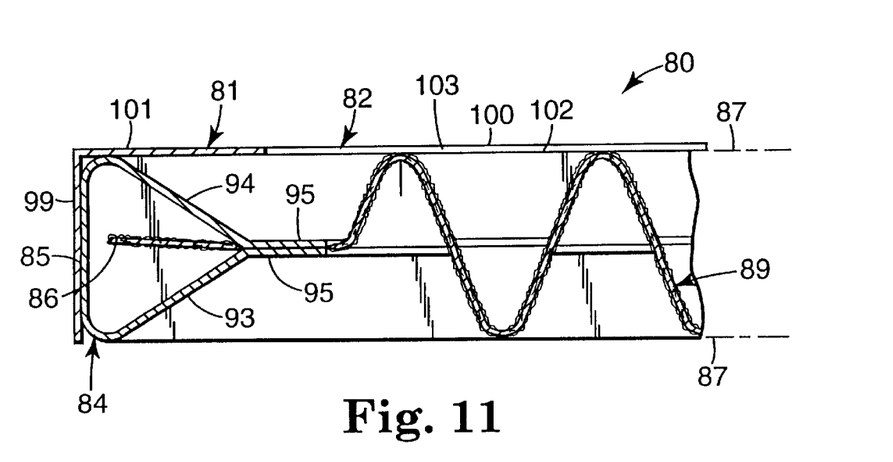
FIG. 11 is an enlarged sectional view taken approximately along line 11—11 of FIG. 10.

Referring now to FIGS. 10 and 11, there is illustrated a second embodiment of a disposable air filter according to the present invention generally designated by the reference numeral 80.

As can be seen from a comparison of the disposable air filter 80 with the prior art disposable air filters 12 and 28 illustrated in FIGS. 1, 2, 5, and 6, a frame 81 for the disposable air filter 80 is formed by adding a reinforcing frame component 82 that has essentially the same structure as one part 31 of the frame 29 for the prior art disposable air filter 28 described above with reference to FIGS. 5 and 6 to a peripheral "pinch" frame component 84 that has essentially the same structure as the "pinch" frame 10 of the prior art disposable air filter 12 described above with reference to FIGS. 1 and 2. Like the frame 10 of the disposable air filter 12, the peripheral "pinch" frame component 84 is of folded and adhered together chip board portions, includes elongate edge wall portions 85 disposed in a rectangle and generally at right angles with respect to parallel planes 87 defined by the outer edges of pleats or corrugations on opposite sides of a pleated or corrugated sheet 89 of filter media, which edge wall portions 85 extend along, across, and entirely around a rectangular peripheral edge 86 of the sheet 89 of filter media. That chip board peripheral frame component 84 also includes elongate retaining wall portions 93 and 94 that extend from the opposite edges of the edge wall portions 85 for short distances along the opposite major surfaces of the pleated sheet 89 of filter media. Distal parts 95 of those retaining wall portions 93 and 94 opposite each other and spaced from the edge wall portions 85 are attached to the sheet 89 of filter media by means such as a suitable adhesive (the ends of the pleats between the retaining wall portions 93 and 94 being flattened), and end parts of the retaining wall portions 93 and 94 at the corners of the filter 80 overlap and are attached by means such as a suitable adhesive. Those retaining wall portions 93 and 94 extend from edges of the edge wall portions 85 at angles significantly less than a right angle with respect to the edge wall portions 85 (i.e., an angle of about 60 degrees) so that the cross section of the peripheral frame component 84 (see FIG. 11) is generally in the shape of an equilateral or isosceles triangle and the peripheral frame component 84 only extends around peripheral portions of the sheet 89 of filter media.

The reinforcing frame component 82, like one part 31 of the folded chip board frame 29 for the air filter 28 described above with reference to FIGS. 5 and 6, includes elongate outer wall portions 99 disposed generally at right angles with respect to the parallel planes 87 defined by the pleated sheet 89 of filter media, which outer wall portions 99 overlay and are attached by means such as a suitable adhesive along outer surfaces of the edge wall portions 85 with the outer wall portions 99 disposed at generally a right angle with respect to the parallel planes 87 defined by the outer edges of the pleats on opposite sides of the filter media 86. That reinforcing frame component 82 also includes a side wall portion 100 extending from corresponding edges of the outer wall portions 99 entirely across the sheet 89 of filter media along and parallel to one of the planes 87. That side wall portion 100 includes a continuous retaining wall part 101 extending a short distance (e.g., 1 inch or 2.54 centimeters) from corresponding edges of the outer wall portions 99 at about right angles with respect to the outer wall portions 99, and intersecting elongate grid-like parts 102 extending between oppositely disposed locations along the retaining wall part 101 and defining large triangular or diamond shaped openings 103 through the side wall portion 100 that afford free passage of air through the side wall portion 100.

The present invention has now been described with reference to two embodiments thereof It will be apparent to those skilled in the art that many changes can be made in the embodiments described without departing from the scope of the present invention. For example, the frames described above could be made of many materials other than chip board, including plastics such as polypropylene, polyethylene, acrylics, etc. Instead of defining diamond shaped, openings, the grid-like parts 72 or 102 of the side wall portion 70 or 100 could define openings of other shapes such as circles, triangles, squares, trapezoids or rectangles or combinations thereof Instead of the intersecting elongate grid-like parts 72 or 102 of the side wall portion 70 or 100 being integral with the retaining wall part 71 or 101 thereof, the intersecting elongate grid-like parts 72 or 102 could overlap and be adhered or otherwise fastened to the retaining wall part 71 or 101. Either of the reinforcing frame components 52 or 82 for the frames 51 or 81 of the filters 50 or 80 described above could be modified by removing the intersecting elongate grid-like parts 72 or 102 from the side wall portion 70 or 100 thereof while leaving the retaining wall part 71 or 101 thereof, in which case the reinforcing frame component 52 or 82 should still cause the frame 51 or 81 to have significantly improved strength compared to the frames 10 and 11 of the prior art air filters 12 and 13 described above. Instead of being pleated, the sheets 59 and 89 of filter media in the filters 50 and 80 could have planar surfaces defining the parallel planes 57 and 87. Thus, the scope of the present invention should not be limited to the structures and methods described in this application, but only by the structures and methods described by the language of the claims and the equivalents thereof

What is claimed is:

1. An air filter comprising:
   a sheet of filter media having opposite first and second major surfaces and a peripheral edge between said surfaces, at least portions of said major surfaces being disposed to define parallel planes along said opposite surfaces of said sheet, which planes are intended to be placed normal to the direction of movement of air through the filter; and
   a frame, said frame comprising:
      a peripheral frame component around the peripheral edge of said sheet, said peripheral frame component comprising
         elongate edge wall portions having opposite first and second edges, said edge wall portions extending along and across said peripheral edge of said sheet between said edges, and being disposed in a rectangle at generally a right angle with respect to said parallel planes,
         elongate first retaining wall portions extending from said first edges of said edge wall portions for a short distance along said first major surface of said sheet of filter media, and
         elongate second retaining wall portions extending from said second edges of said edge wall portions for a short distance along said second major surface of said sheet of filter media,
         parts of said first and second attachment wall portions opposite each other and spaced from said edge wall portions being attached to said sheet of filter media; and
      a reinforcing frame component comprising
         elongate outer wall portions overlaying and attached along a surface of said edge wall opposite said sheet of filter media and being disposed at generally a right angle with respect to said parallel planes, and
         a side wall portion extending from said outer wall portions across said sheet of filter media, said side wall portion having a continuous retaining wall part extending a short distance from corresponding edges of the side wall portions at about right angles with respect to the side wall portions, and intersecting grid-like parts extending between oppositely disposed locations along the retaining wall part and defining large openings through the side wall portion that afford free passage of air through said side wall portion.

2. An air filter according to claim 1 wherein said first retaining wall portions extend from said first edges of said edge wall portions generally at a right angle with respect to said edge wall portions, said second retaining wall portions extend from said second edges of said edge wall portions at an angle significantly less than a right angle with respect to said edge wall portions, and said side wall portion extends from the edges of said outer wall portions adjacent said second edges of said edge wall portion.

3. An air filter according to claim 1 wherein said first and said second retaining wall portions extend from said edges of said edge wall portions at angles significantly less than a right angle with respect to said edge wall portions.

4. An air filter comprising:
   a sheet of filter media having opposite first and second major surfaces and a peripheral edge between said surfaces, at least portions of said major surfaces being disposed to define parallel planes along said opposite surfaces of said sheet, which planes are intended to be placed normal to the direction of movement of air through the filter, and
   a frame, said frame comprising:
      a peripheral frame component around the peripheral edge of said sheet, said peripheral frame component comprising
         elongate edge wall portions having opposite first and second edges, said edge wall portions extending along and across said peripheral edge of said sheet between said edges, and being disposed in a rectangle at generally a right angle with respect to said parallel planes,
         elongate first retaining wall portions extending from said first edges of said edge wall portions for a short distance along said first major surface of said sheet of filter media, and
         elongate second retaining wall portions extending from said second edges of said edge wall portions for a short distance along said second major surface of said sheet of filter media,
         parts of said first and second retaining wall portions opposite each other and spaced from said edge wall portions being attached to said sheet of filter media; and
      a reinforcing frame component comprising
         elongate outer wall portions overlaying and attached along a surface of said edge wall opposite said sheet of filter media and being disposed at generally a right angle with respect to said parallel planes, and
         a side wall portion extending from said outer wall portions across said sheet of filter media, said side wall portion comprising a continuous retaining wall part extending a short distance from corresponding edges of the side wall portions at about right angles with respect to the side wall portions.

5. An air filter according to claim 4 wherein said first retaining wall portions extend from said first edges of said edge wall portions generally at a right angle with respect to said edge wall portions, said second retaining wall portions extend from said second edges of said edge wall portions at an angle significantly less than a right angle with respect to said edge wall portions, and said side wall portion extends from the edges of said outer wall portions adjacent said second edges of said edge wall portion.

6. An air filter according to claim 4 wherein said first and said second retaining wall portions extend from said edges of said edge wall portions at angles significantly less than a right angle with respect to said edge wall portions.

* * * * *